United States Patent
Feng et al.

(10) Patent No.: US 11,010,083 B2
(45) Date of Patent: May 18, 2021

(54) METHOD AND DEVICE OF MANAGING STORAGE SYSTEM

(71) Applicant: EMC IP Holding Company LLC, Hopkinton, MA (US)

(72) Inventors: Changyu Feng, Beijing (CN); Jian Gao, Beijing (CN); Xinlei Xu, Beijing (CN); Lifeng Yang, Beijing (CN); Xiongcheng Li, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/191,926

(22) Filed: Nov. 15, 2018

(65) Prior Publication Data

US 2019/0332309 A1    Oct. 31, 2019

(30) Foreign Application Priority Data

Apr. 28, 2018 (CN) .......................... 201810400748.9

(51) Int. Cl.
*G06F 3/06* (2006.01)

(52) U.S. Cl.
CPC .......... *G06F 3/0647* (2013.01); *G06F 3/0604* (2013.01); *G06F 3/0683* (2013.01); *G06F 3/0689* (2013.01)

(58) Field of Classification Search
CPC ........ G06F 3/06; G06F 3/0647; G06F 3/0683; G06F 3/0604

USPC ......................................................... 711/165
See application file for complete search history.

(56) References Cited

U.S. PATENT DOCUMENTS

| | | | |
|---|---|---|---|
| 8,473,566 B1 | 6/2013 | Cardente et al. | |
| 9,507,887 B1* | 11/2016 | Wang | G06F 3/0685 |
| 10,101,917 B1 | 10/2018 | Agans | |
| 10,282,107 B1 | 5/2019 | Martin et al. | |
| 10,503,437 B2 | 12/2019 | Martin et al. | |
| 10,592,137 B1 | 3/2020 | Khokhar et al. | |
| 2008/0147902 A1* | 6/2008 | Ishii | G06F 11/0745 |
| | | | 710/19 |
| 2012/0173831 A1* | 7/2012 | Rubio | G06F 3/0605 |
| | | | 711/165 |
| 2015/0195344 A1* | 7/2015 | Surendran | G06F 9/5066 |
| | | | 709/201 |

* cited by examiner

*Primary Examiner* — Michael Krofcheck
*Assistant Examiner* — John Francis Wojton
(74) *Attorney, Agent, or Firm* — BainwoodHuang (57) ABSTRACT

Various techniques manage a storage system. Such techniques involve: in response to detecting that a first request of a plurality of requests initiated for a bulk request is completed, determining a response time length for the first request, the bulk request being used to migrate data from a first storage device to a second storage device, each request of the plurality of requests being used to read data from the first storage device and write data to the second storage device; determining an average response time length of the completed requests of the plurality of requests based at least in part on the response time length for the first request; and updating the number of the plurality of requests initiated for the bulk request based on the average response time length.

13 Claims, 8 Drawing Sheets

METHOD AND DEVICE OF MANAGING STORAGE SYSTEM

FIELD

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Embodiments of the present disclosure relate to a storage system, and more specifically to a method, device, and computer readable storage medium of managing a storage system.

BACKGROUND

At present, there is a need in many cases to non-destructively migrate a logic unit (LU) within a storage array, for example, transfer a LU from a storage pool to another storage pool, and change the type of the UL, and so on. During LUs migration, the storage array needs to transfer data from a source to a destination and serve IOs non-destructively from a host at the same time.

However, in the current storage system, when a bulk request for a segment of the LU is initiated, as many as possible free requests will be obtained from free request pools to process the bulk request. This may affect the performance of the host IO, and may cause backend overload. In addition, this may cause a less efficient use of requests, for example, more requests handle the bulk request with a very slow response time, or more requests handle the bulk request with a very quick response time.

Therefore, it is desirable to provide an improved solution for managing a storage system.

SUMMARY

To solve the above and other potential problems, embodiments of the present disclosure provide a method and device of managing a storage system.

According to a first aspect of the present disclosure, there is provided a method of managing a storage system. The method comprises: in response to detecting that a first request of a plurality of requests initiated for a bulk request is completed, determining a response time length for the first request, the bulk request being used to migrate data from a first storage device to a second storage device, each request of the plurality of requests being used to read data from the first storage device and write data to the second storage device; determining an average response time length of the completed requests of the plurality of requests based at least in part on the response time length of the first request; and updating the number of the plurality of requests initiated for the bulk request based on the average response time length.

According to a second aspect of the present disclosure, there is provided an device for managing a storage system. The device comprises: at least one processing unit; a memory coupled to the at least one processing unit and having instructions stored thereon, the instructions, when executed by the at least one processing unit, causing the device to perform acts comprising: in response to detecting that a first request of a plurality of requests initiated for a bulk request is completed, determining a response time length for the first request, the bulk request being used to migrate data from a first storage device to a second storage device, each request of the plurality of requests being used to read data from the first storage device and write data to the second storage device; determining an average response time length for the completed requests of the plurality of requests based at least in part on a response time length of the first request; and updating the number of the plurality of requests initiated for the bulk request based on the average response time length.

According to a third aspect of the present disclosure, there is provided a computer readable storage medium having machine-executable instructions stored thereon, the machine executable instructions, when executed by at least one processor, causing the at least one processor to perform the method according to the first aspect.

According to a fourth aspect of the present disclosure, there is provided a computer program product that is stored on a computer readable medium and includes machine-executable instructions, wherein the machine-executable instructions, when being executed, cause the machine to execute the method according to the first aspect.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The above and other objectives, features, and advantages of example embodiments of the present disclosure will become more apparent from the following detailed description with reference to the accompanying drawings, in which the same reference symbols refer to the same elements.

DETAILED DESCRIPTION OF EMBODIMENTS

Preferred embodiments of the present disclosure will be described as follows in greater detail with reference to the drawings. Although preferred embodiments of the present disclosure are illustrated in the drawings, it is to be understood that the present disclosure described herein can be implemented in various manners, not limited to the embodiments illustrated herein. Rather, these embodiments are provided to make the present disclosure described herein clearer and more complete and convey the scope of the present disclosure described herein completely to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The term "one example implementation" and "an example implementation" are to be read as "at least one example implementation." The term "another implementation" is to be read as "at least one other implementation." Terms "a first", "a second" and others can denote different or identical objects. The following text may also contain other explicit or implicit definitions.

As described above, each LU migration request will consume many individual requests and will trigger a lot of IO requests to the underlying drivers. These individual requests and IO requests are limited system resources. Different volumes have different migration speed depending on how busy it is and the condition of the underlying drivers. Hence, it is necessary to control the number of individual requests for each bulk request to use system resource more efficiently. However, the current storage system does not have a mechanism which dynamically adjusts the number of individual DM requests for a migration request. For example, when TDX initiate a bulk DM request, DML will get as many free requests as possible from the free request pool. This solution has a negative effect on the host IO. For a busy volume (busy providing the host with IO service), if too many individual requests are started to perform migration, it will impact the response time of host IOs. In addition, this solution may cause backend overload. For example, in some cases, the backend RAID group is rebuilding, the underlying drivers will become slow. However, DML may still send as many requests as possible to the underlying driver. This will overload the underlying drivers.

In addition, this may cause inefficient use of requests. Different bulk requests are directed to different volumes including different RAID groups. Therefore, the response time lengths for bulk requests are different. The free requests are limited resource on the system, if the free requests are used by a bulk request with a high response time, the bulk request with a low response time will has no free DM requests available.

Embodiments of the present disclosure provide a method for dynamically adjusting the number of outstanding individual requests for each migration session according to the migration speed. This method will allow more individual requests to be used by the faster migration session and less individual request to be used by the slower migration session. Therefore, this enables the system resource to be used more efficiently and lessens impact on the host IOs.

Figure 1:
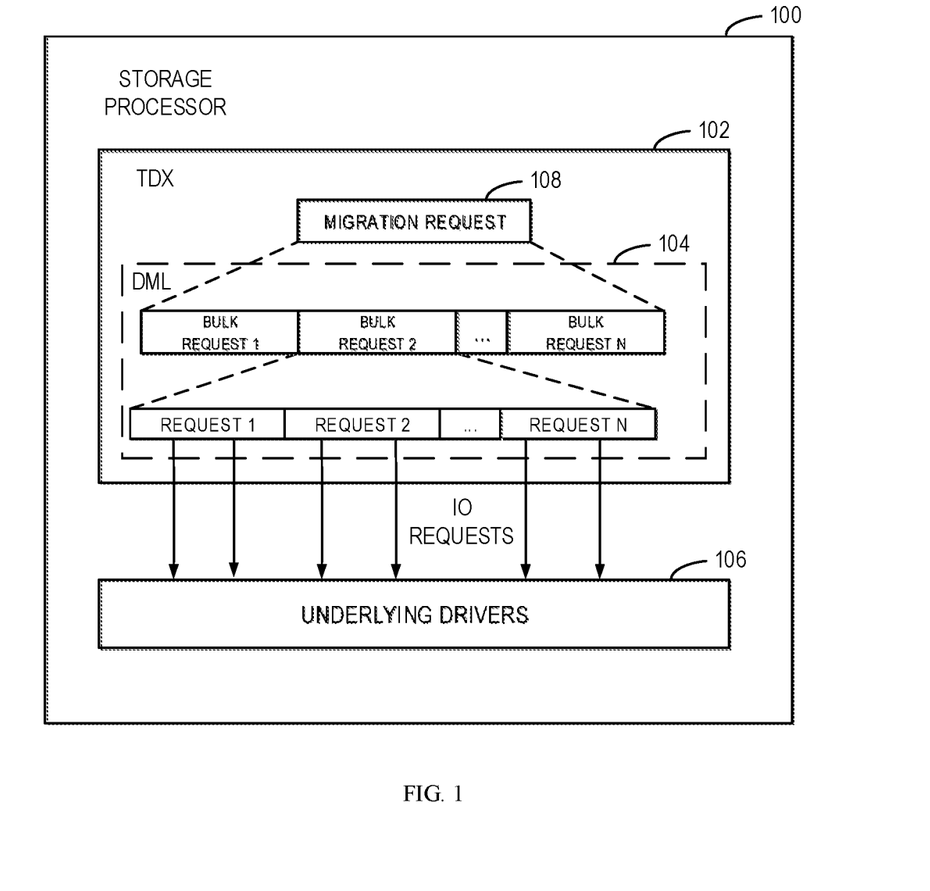
FIG. 1 illustrates a schematic diagram of an example architecture according to some embodiments of the present disclosure.

FIG. 1 illustrates a block diagram of a storage processor 100 according to an embodiment of the present disclosure. As shown in FIG. 1, the storage processor 100 may comprise a transparent data transmission (TDX) 102, a data move library (DML) 104 and underlying drivers 106. However, it should be appreciated that this architecture is provided as an example only, and those skilled in the art can use any other suitable architecture to implement embodiments of the present disclosure.

As shown in FIG. 1, the TDX 102 performs data migration according to a migration request 108 for data migration (for example, a LU migration). The TDX 102 uses DML 104 to perform data copy. For example, TDX 102 starts a copy session to track the migration progress, and splits the copy range to a number of segments. For each segment, TDX 102 calls DML 104 to initiate an associated data move (DM) request, and then DML 104 splits the bulk request into a number of individual requests. For the sake of clarity, individual requests are referred to as requests herein. As shown in FIG. 1, the bulk request 2 is split into request 1-request N. DML 104 runs the requests simultaneously. Each request is associated with two IO requests: one IO request reads data from a first storage device, and the other IO request writes data to a second storage device. These IO requests are sent to the underlying driver 106 to perform read/write operations for the corresponding storage device.

Figure 2:
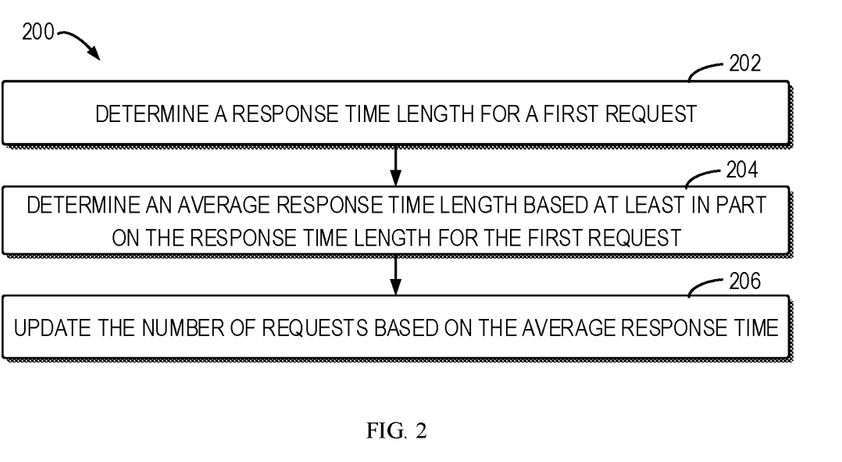
FIG. 2 illustrates a flow chart of a method for managing a storage system according to some embodiments of the present disclosure.

FIG. 2 illustrates a high-level flow chart of a method 200 for managing a storage system according to some embodiments of the present disclosure. For example, the method 200 may be performed at the storage processor 100, for example, performed at DML 104.

At 202, if it is detected that a first request of a plurality of requests initiated for the bulk request is completed, a response time length for the first request is determined. The bulk request is used to migrate data (for example, a segment of a LUN) from a first storage device to a second storage device, each request being used to read data from the first storage device and write data to the second storage device.

At 204, an average response time length of one or more completed requests of the plurality of requests (for example, all the completed requests) is determined based at least in part on the response time length for the first request. For example, it is possible to determine the average response time by progressive decreasing average.

At 206, the number of the plurality of requests initiated for the bulk request is updated based on the average response time length. For example, if the average response time length is determined to be less than a first threshold, a plurality of additional requests are initiated for the bulk request; if the average response time is determined to be greater than the first threshold and less than a second threshold, an additional request is re-started to keep the number of requests for the bulk request unchanged; and if the average response time is greater than the second threshold, other requests of the plurality of requests than the first request are kept.

Figure 3:
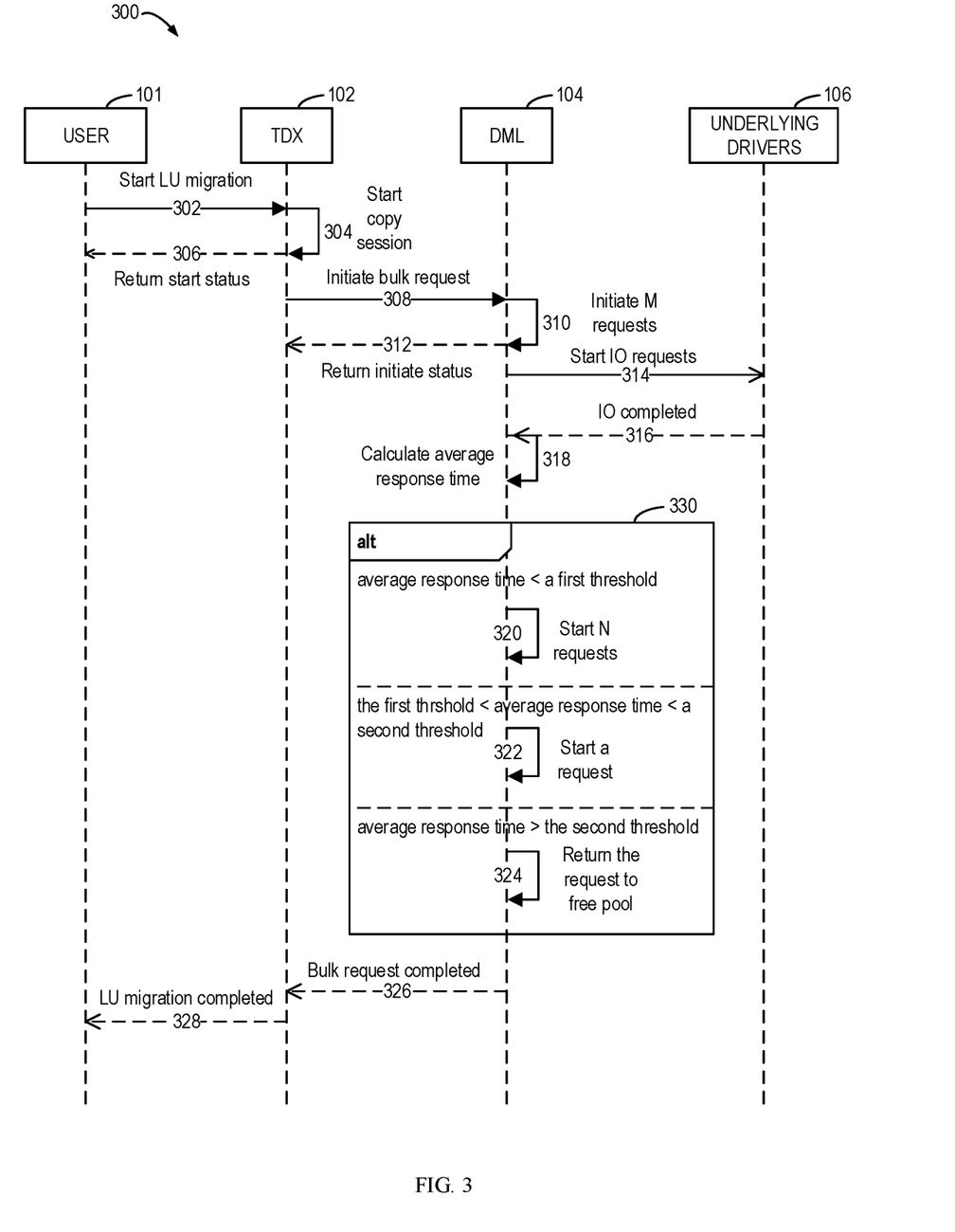
FIG. 3 illustrates an interaction diagram of a method of managing a storage system according to some embodiments of the present disclosure.

FIG. 3 illustrates an interaction diagram of a method of managing a storage system according to some embodiments of the present disclosure. It should be appreciated that FIG. 3 is provided to enable those skilled in the art to better understand and implement embodiments of the present disclosure, not to limit the scope of the present disclosure. The method shown in FIG. 3 will be described with reference to FIG. 1.

During LUN migration, TDX 102 splits the copy range into a number of segments and then starts to copy segments. Each segment is associated with a bulk request in DML. Therefore, it is possible to adjust the number of outstanding individual DM requests for each LUN migration session by controlling the number of individual requests for each bulk DM request.

DML can "learn" the status of the migrated LUN according to the average response time length of the first few individual DM requests which are part of the same bulk request. If the response time is high, which means the target is busy or in a degraded status, DML should reduce the number of outstanding individual requests for the bulk request in order to lessen impact on the host IOs and avoid overloading the underlying drivers; otherwise, DML increases the number of outstanding requests to accelerate the migration progress.

At 302, the user starts the LU migration. At 304, TDX 102 starts the copy session. At 306, the TDX 102 returns the start state of the copy session to the user.

At 308, the TDX 102 initializes the bulk request. At 310, the DML 104 starts or initiates M requests. DML 104 maintains a free request pool with a predetermined number of requests. For each bulk request, DML 104 may request to obtain one or more individual requests from the free request pool and put back the one or more individual requests to the pool after using the requests. For example, each bulk request may have M+N (M≥1, N≥0) individual requests, wherein M is the number of individual requests embedded in a bulk request and N is the number of individual requests which are obtained from the free request pool. The embedded requests may ensure continuous operation of the bulk request.

At 312, DML 104 returns a start state for starting the M requests. At 314, the DML 104 initiates the IO request. For each individual request, DML 104 may record the start time in the individual request. At 316, the underlying driver 106 returns an indication of completion of the IO to the DML 104. At 318, the DML 104 may calculate the average response time length after receiving the indication of completion of the IO. When an individual request is completed, DML 104 may calculate the response time length for the individual request and calculate the average response time length of the bulk request based on the response time length.

In some embodiments, the average response time length may be calculated by a decaying average. As the most recent response time is more representative of the current status of the underlying volumes, more weight should be put on the most recent response time. DML uses the Decaying Average as the average response time.

$$\overline{T}_n = \begin{cases} T_1, & n = 1 \\ \dfrac{T_n}{D} + \dfrac{D-1}{D}\overline{T}_{n-1}, & n > 1 \end{cases} \quad (1)$$

where D represents the Decaying Factor, $T_n$ represents the response time length of the N individual requests, and $\overline{T}_n$ represents the average response time length of N individual requests.

At 330, the DML 104 may adjust the number of individual requests based on the calculated average response time length. At 320, if the average response time length is determined to be less than a first threshold, N requests are initiated. To this end, DML 104 may determine whether the bulk request requires more work to be performed and/or whether the free request pool has available free requests. For example, N may be an integer multiple of M.

At 322, if the average response time length is determined to be greater than the first threshold and less than the second threshold, one request is initiated to keep the number of outstanding requests to be unchanged. For example, the first threshold may be a half of the second threshold.

At 324, if the average response time length is greater than the second threshold, the request that has just been completed is released into the free request pool. In some cases, it is further possible to determine whether the number of requests that are currently not yet completed is less than the number of embedded requests. If yes, one request may be initiated.

At 326, the DML 104 sends an indication of completion of the bulk request to the TDX 102. At 328, the TDX 102 may send an indication of completion of LU migration to the user.

Figure 4:
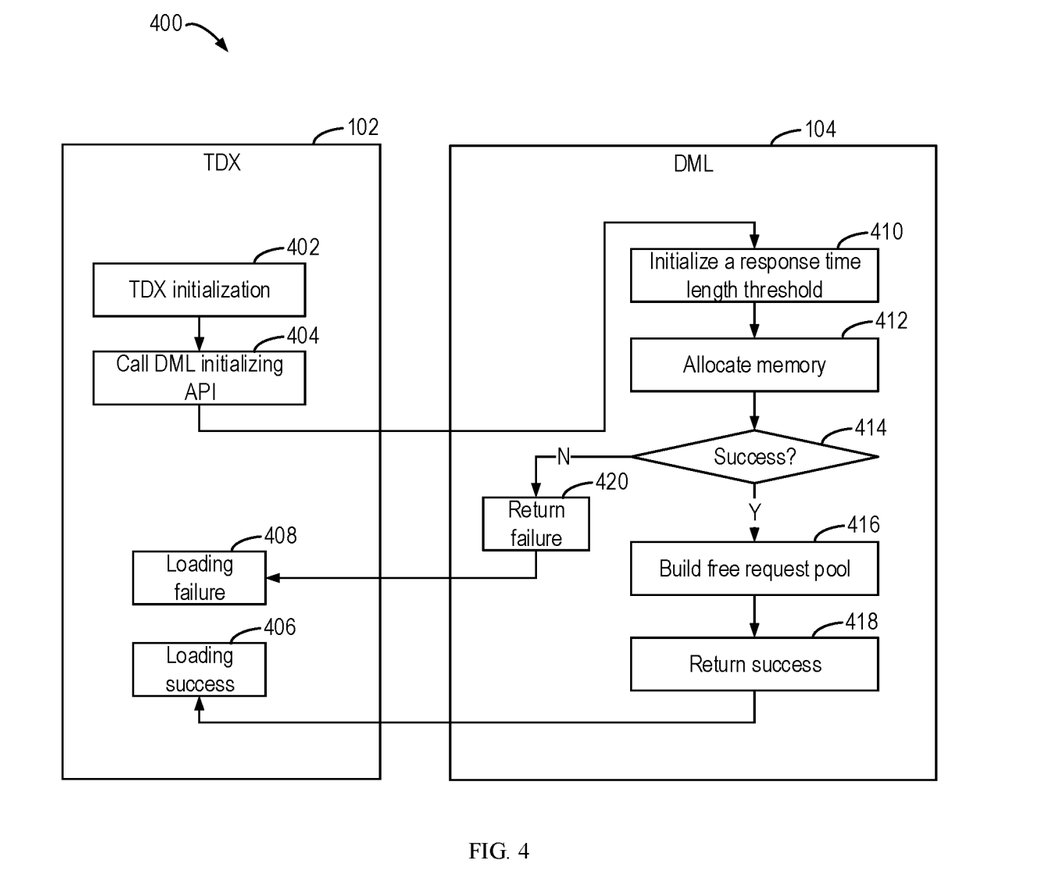
FIG. 4 illustrates a flow chart of a method for loading a driver according to some embodiments of the present disclosure.

FIG. 4 illustrates a flow chart of a method 400 for loading a TDX driver according to some embodiments of the present disclosure. The method 400 may be performed at the storage processor 100 as shown in FIG. 1.

At 402, TDX 102 performs initialization. At 404, TDX 102 calls DML 104's API to initialize an instance of DML. At 410, the DML 104 initializes the response time threshold. For example, DML 104 may obtain the value of response time threshold from a register and store the response time threshold in the global data. At 412, DML 104 allocates memory from the system. At 414, DML 104 determines whether the memory is allocated successfully. In the case of successful allocation, DML 104 builds a free requests pool at 416, and returns success of loading at 418. At 406, TDX 406 outputs an indication of the success of loading. In the case of failed allocation, failure to load is returned at 420. At 408, TDX 102 outputs an indication of failure to load.

Figure 5:
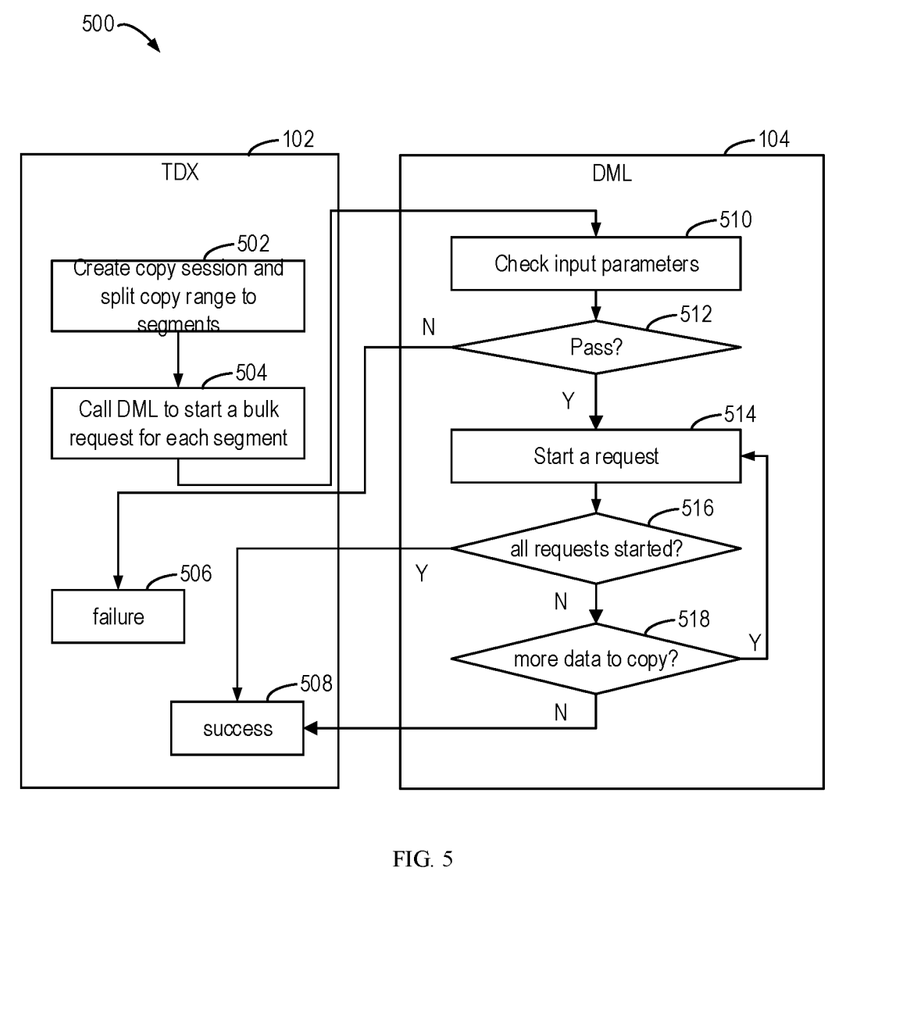
FIG. 5 illustrates a flow chart of a method for starting a migration according to some embodiments of the present disclosure.

FIG. 5 illustrates a flow chart of a method 500 for starting a migration according to some embodiments of the present disclosure. The method 500 may be performed at the storage processor 100 as shown in FIG. 1.

At 502, TDX 102 creates a copy session and splits the copy range into a number of segments. At 504, for each segment, TDX 104 calls DML 104 to initiate a bulk request. At 510, DML 104 checks an input parameter. At 512 it is determined whether the input parameter passes the check. If the input parameter passes the check at 512, one or more requests are initiated at 514. If the input parameter fails to pass the check at 512, an indication of start failure is returned at 506.

At 516 it is determined whether all requests are already initiated. If it is determined at 516 that all requests are initiated, an indication of a successful start is returned at 508. If it is determined at 516 that there are still requests not initiated, it is determined at 518 whether there is more data to be copied. If it is determined at 518 that there is no data to be copied, an indication of successfully starting LU migration is returned at 508. If it is determined at 518 that there is still data to be copied, the method 500 returns to 514, to further initiate one or more requests.

Figure 6:
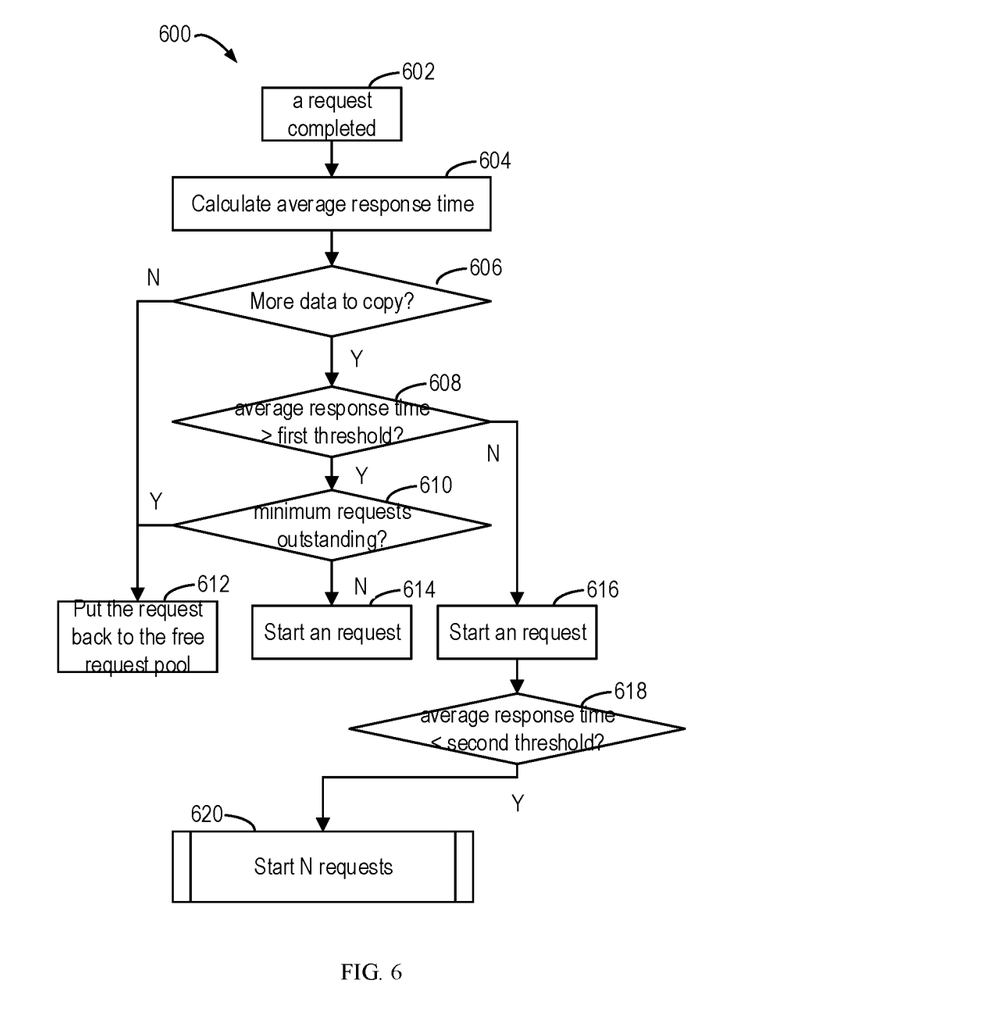
FIG. 6 illustrates a flow chart of a method of managing a storage system according to some embodiments of the present disclosure.

FIG. 6 illustrates a flow chart of a method 600 of managing a storage system according to some embodiments of the present disclosure. The method 600 may be performed at the storage processor (for example, DML 104) as shown in FIG. 1. For example, when one individual request of the bulk request is completed, DML 104 may adjust the number of outstanding individual requests for this bulk request according to the average response time length of all the completed individual requests.

At 602, it is detected that one request for the bulk request is completed. At 604, the average response time length for the bulk request is calculated. At 606, it is determined whether there is still data to be copied for this bulk request. If there is still data to be copied, the method 600 proceeds to 608. At 608, it is determined whether the average response time length is greater than the first threshold. If it is determined at 608 that the average response time length is greater than the first threshold, the method 600 proceeds to 610. At 610, it is determined whether there are still a minimum number of requests (for example, M embedded requests). If there are still a minimum number of requests, the method 600 proceeds to 612, where the request is put back or released to the free request pool. If there are not a minimum number of requests, the method 600 proceeds to 614, where a request is started. If it is determined at 606 that there is no data to be copied, the method 600 proceeds to 612, where the request is put back to the free request pool.

If it is determined at 608 that the average response time length is not greater than the first threshold, the method 600 proceeds to 616, where a request is started. At 618, it is determined whether the average response time length is less than the second threshold that is less than the first threshold. If it is determined at 618 that the average response time length is less than the second threshold, N requests are started. For example, N may be equal to M−1.

Figure 7:
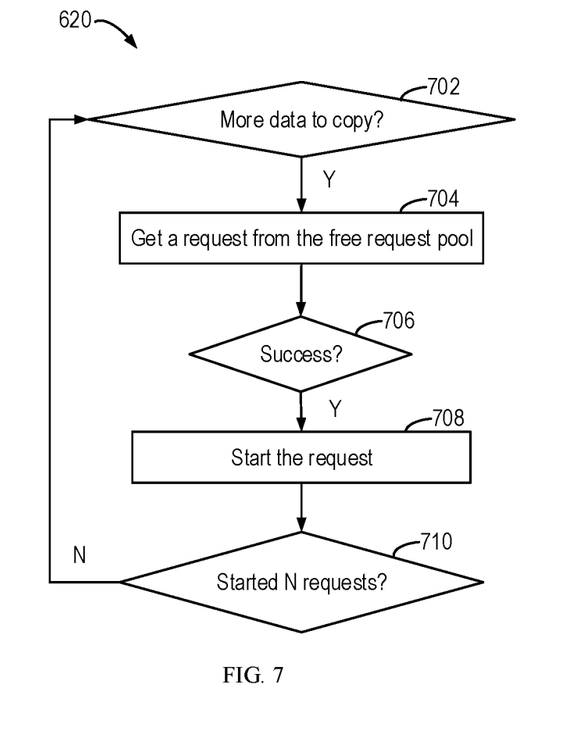
FIG. 7 illustrates a flow chart of a method of initiating requests according to some embodiments of the present disclosure.

FIG. 7 illustrates a flow chart of a method 620 of starting N requests according to some embodiments of the present disclosure. At 702, it is determined whether there is still data to be copied. If yes, a request is obtained at 704 from the free request pool. At 706, it is determined whether a request has been obtained successfully. If the request has been obtained successfully, the request is initiated at 708. At 710, it is determined whether N requests have already been initiated. If no, the method 620 returns to 702.

Figure 8:
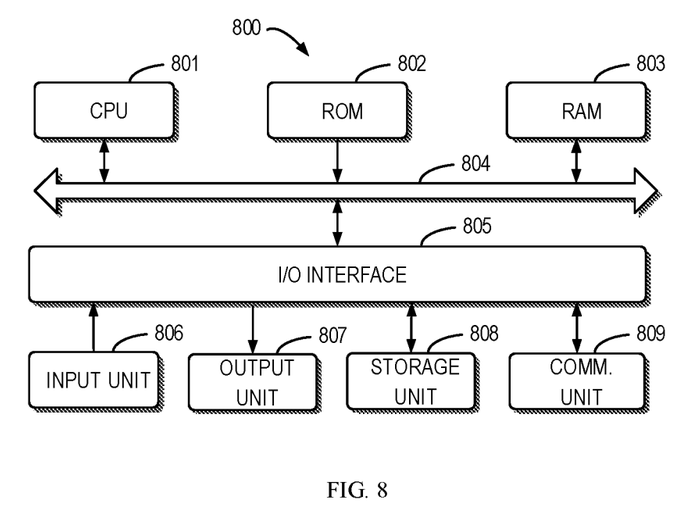
FIG. 8 illustrates a block diagram of an example device adapted to implement the embodiments of the present disclosure according to some embodiments of the present disclosure.

FIG. 8 illustrates a block diagram of an example apparatus 800 adapted to implement the embodiments of the present disclosure. As shown in the figure, the apparatus 800 comprises a central processing unit (CPU) 801 that may perform various appropriate actions and processing based on computer program instructions stored in a read-only memory (ROM) 802 or computer program instructions loaded from a memory unit 808 to a random access memory (RAM) 803. In the RAM 803, there further store various programs and data needed for operations of the device 800. The CPU 801, ROM 802 and RAM 803 are connected to each other via a bus 804. An input/output (I/O) interface 805 is also connected to the bus 804.

Various components in the device 800 are connected to the I/O interface 805, including: an input unit 806 such as a keyboard, a mouse and the like; an output unit 807 including various kinds of displays and a loudspeaker, etc.; a memory unit 808 including a magnetic disk, an optical disk, and etc.; a communication unit 809 including a network card, a modem, and a wireless communication transceiver, etc. The communication unit 809 allows the device 800 to exchange information/data with other devices through a computer network such as the Internet and/or various kinds of telecommunications networks.

Various processes and processing described above, e.g., method 200, may be executed by the processing unit 801. For example, in some embodiments, the method 200 may be implemented as a computer software program that is tangibly embodied on a machine readable medium, e.g., the storage unit 808. In some embodiments, part or all of the computer program may be loaded and/or mounted onto the device 800 via ROM 802 and/or communication unit 809. When the computer program is loaded to the RAM 803 and executed by the CPU 801, one or more steps of the at least one of the method 200 as described above may be executed. Alternatively, in other implementations, the CPU 801 may also be configured to implement the abovementioned method in any other suitable manners (e.g., by virtue of a firmware).

Embodiments of the present disclosure relate to a method, apparatus, system and/or computer program product. The computer program product may include a computer readable storage medium on which computer readable program instructions for executing various aspects of the present disclosure are embodied.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A method of managing a storage system, comprising:
   in response to a migration request for a data migration from a first storage device to a second storage device, initiating a copy session to track progress of the data migration, the copy session having an associated copy range;
   splitting the copy range into a plurality of segments;
   for each segment from among the plurality of segments, initiating a plurality of individual requests of a bulk request to migrate data from the first storage device to the second storage device, each of the plurality of individual requests for reading data from the first storage device and writing data to the second storage device, the plurality of individual requests including an outstanding number of individual requests initiated for the bulk request;
   in response to detecting that a first request from among the plurality of individual requests initiated for the bulk request has completed, determining a response time length for the first request;
   determining an average response time length for one or more second requests from among the plurality of individual requests that have completed, based at least in part on the response time length for the first request; and
   updating, based on the determined average response time length, the outstanding number of individual requests initiated for the bulk request,
   wherein updating the outstanding number of individual requests initiated for the bulk request comprises:
      in response to determining that the average response time length is less than a first time length threshold, increasing the outstanding number of individual requests initiated for the bulk request by initiating a plurality of additional individual requests for the bulk request.

2. The method of claim 1, wherein a first time length threshold is less than a second time length threshold, and wherein updating the outstanding number of individual requests initiated for the bulk request comprises:
   in response to determining that the average response time length is greater than the first time length threshold and less than the second time length threshold, keeping the outstanding number of individual requests initiated for the bulk request unchanged by reinitiating a respective individual request from among the outstanding number of individual requests.

3. The method of claim 2, wherein updating the outstanding number of individual requests initiated for the bulk request comprises:

in response to determining that the average response time length is greater than the second time length threshold, reducing the outstanding number of individual requests initiated for the bulk request by keeping one or more individual requests from among the outstanding number of individual requests other than the first request for initiation at a later time.

4. The method of claim 1, wherein determining the average response time length comprises determining the average response time length by a decaying average.

5. A device of managing a storage system, comprising:
a processing unit; and
a memory coupled to the processing unit and having instructions stored thereon, the instructions, when executed by the processing unit, causing the device to perform acts comprising:
in response to a migration request for a data migration from a first storage device to a second storage device, initiating a copy session to track progress of the data migration, the copy session having an associated copy range;
splitting the copy range into a plurality of segments;
for each segment from among the plurality of segments, initiating a plurality of individual requests of a bulk request to migrate data from the first storage device to the second storage device, each of the plurality of individual requests for reading data from the first storage device and writing data to the second storage device, the plurality of individual requests including an outstanding number of individual requests initiated for the bulk request;
in response to detecting that a first request from among the plurality of individual requests initiated for the bulk request has completed, determining a response time length for the first request,
determining an average response time length of one or more second requests from among the plurality of individual requests that have completed, based at least in part on the response time length for the first request, and
updating, based on the determined average response time length, the outstanding number of individual requests initiated for the bulk request,
wherein updating the outstanding number of individual requests initiated for the bulk request comprises:
in response to determining that the average response time length is less than a first time length threshold, increasing the outstanding number of individual requests initiated for the bulk request by initiating a plurality of additional individual requests for the bulk request.

6. The device of claim 5, wherein a first time length threshold is less than a second time length threshold, and wherein updating the outstanding number of individual requests initiated for the bulk request comprises:
in response to determining that the average response time length is greater than the first time length threshold and less than the second time length threshold, keeping the outstanding number of individual requests initiated for the bulk request unchanged by reinitiating a respective individual request from among the outstanding number of individual requests.

7. The device of claim 6, wherein updating the outstanding number of individual requests initiated for the bulk request comprises:
in response to determining that the average response time length is greater than the second time length threshold, reducing the outstanding number of individual requests initiated for the bulk request by keeping one or more individual requests from among the outstanding number of individual requests other than the first request for initiation at a later time.

8. The device of claim 5, wherein determining the average response time length comprises determining the average response time length by a decaying average.

9. A computer readable storage medium having machine-executable instructions stored thereon, the machine executable instructions, when executed by at least one processor, causing the at least one processor to perform a method, comprising:
in response to a migration request for a data migration from a first storage device to a second storage device, initiating a copy session to track progress of the data migration, the copy session having an associated copy range;
splitting the copy range into a plurality of segments;
for each segment from among the plurality of segments, initiating a plurality of individual requests of a bulk request to migrate data from the first storage device to the second storage device, each of the plurality of individual requests for reading data from the first storage device and writing data to the second storage device, the plurality of individual requests including an outstanding number of individual requests initiated for the bulk request;
in response to detecting that a first request from among the plurality of individual requests initiated for the bulk request has completed, determining a response time length for the first request;
determining an average response time length for one or more second requests from among the plurality of individual requests that have completed, based at least in part on the response time length for the first request; and
updating, based on the determined average response time length, the outstanding number of individual requests initiated for the bulk request
wherein updating the outstanding number of individual requests initiated for the bulk request comprises:
in response to determining that the average response time length is less than a first time length threshold, increasing the outstanding number of individual requests initiated for the bulk request by initiating a plurality of additional individual requests for the bulk request.

10. The computer readable storage medium of claim 9, wherein a first time length threshold is less than a second time length threshold, and wherein updating the outstanding number of individual requests initiated for the bulk request comprises:
in response to determining that the average response time length is greater than the first time length threshold and less than the second time length threshold, keeping the outstanding number of individual requests initiated for the bulk request unchanged by reinitiating a respective individual request from among the outstanding number of individual requests.

11. The computer readable storage medium of claim 10, wherein updating the outstanding number of individual requests initiated for the bulk request comprises:
in response to determining that the average response time length is greater than the second time length threshold, reducing the outstanding number of individual requests initiated for the bulk request by keeping one or more individual requests from among the outstanding number of individual requests other than the first request for initiation at a later time.

12. The computer readable storage medium of claim 9, wherein determining the average response time length comprises determining the average response time length by a decaying average.

13. The computer readable storage medium of claim 9, wherein updating the outstanding number of individual requests initiated for the bulk request includes:
  performing a change operation that changes the outstanding number of individual requests initiated for the bulk request from a first number of individual requests to a second number of individual requests that is different from the first number of individual requests, the change operation modifying at least one operation of the at least one processor to accommodate response time variations during the data migration.

\* \* \* \* \*